US007260677B1

(12) United States Patent
Vartti et al.

(10) Patent No.: US 7,260,677 B1
(45) Date of Patent: Aug. 21, 2007

(54) PROGRAMMABLE SYSTEM AND METHOD FOR ACCESSING A SHARED MEMORY

(75) Inventors: Kelvin S. Vartti, Hugo, MN (US); Ross M. Weber, Coon Rapids, MN (US); Mitchell A. Bauman, Circle Pines, MN (US)

(73) Assignee: Unisys Corporation, Blue Bell, PA (US)

( * ) Notice: Subject to any disclaimer, the term of this patent is extended or adjusted under 35 U.S.C. 154(b) by 642 days.

(21) Appl. No.: 10/620,515

(22) Filed: Jul. 16, 2003

(51) Int. Cl.
*G06F 12/06* (2006.01)
(52) U.S. Cl. ................ 711/112; 711/154; 711/156
(58) Field of Classification Search ............... 711/154, 711/156, 112, 113, 114, 100
See application file for complete search history.

(56) References Cited

U.S. PATENT DOCUMENTS 5,627,992 A * 5/1997 Baror ..................... 711/133
5,911,149 A * 6/1999 Luan et al. ............... 711/147
6,297,988 B1 * 10/2001 Parker et al. ........... 365/185.03
6,496,277 B1 * 12/2002 Chapin et al. ............. 358/1.16

* cited by examiner

*Primary Examiner*—Pierre-Michel Bataille
(74) *Attorney, Agent, or Firm*—Beth L. McMahon; Charles A. Johnson; Richard J. Gregson

(57) ABSTRACT

A memory control system and method is disclosed. In one embodiment, a first memory is coupled to one or more additional memories. The first memory receives requests for data that are completed by retrieving the data from the first memory and/or the one or more additional memories. The manner in which this data is retrieved is determined by the state of programmable control indicators. In one mode of operation, a reference is made to the first memory to retrieve the data. If it is later determined from tag information stored by the first memory that the one or more additional memories must be accessed to fulfill the request, the necessary additional memory references are initiated. In another mode of operation, references to the one or more additional memories are initiated irrespective of whether these references are required. The operating mode may be selected to optimize system efficiency.

32 Claims, 6 Drawing Sheets

PROGRAMMABLE SYSTEM AND METHOD FOR ACCESSING A SHARED MEMORY

RELATED APPLICATIONS

The following co-pending applications of common assignee have some subject matter in common with the current application:

Ser. No. 10/600,205 entitled "Data Acceleration Mechanism for a Multiprocessor Shared Memory System", filed on Jun. 20, 2003, which is incorporated by reference in its entirety.

Ser. No. 10/620,406 entitled "Programmable Cache Management System and Method", filed on even date herewith, and incorporated herein by reference in its entirety.

FIELD OF THE INVENTION

The present invention generally relates to methods and apparatus for controlling a multi-processor shared memory system; and, more particularly, relates to a programmable system and method for controlling access to a shared memory.

DESCRIPTION OF THE PRIOR ART

Data processing systems are becoming increasing complex. Some systems, such as Symmetric Multi-Processor computer systems, couple two or more Instruction Processors (IPs) and multiple Input/Output (I/O) Modules to shared memory. This allows the multiple IPs to operate simultaneously on the same task, and also allows multiple tasks to be performed at the same time to increase system throughput.

As the number of units coupled to a shared memory increases, more demands are placed on the memory and memory latency increases. To address this problem, high-speed cache memory systems are often coupled to one or more of the IPs for storing data signals that are copied from main memory or from other cache memories. These cache memories are generally capable of processing requests faster than the main memory while also serving to reduce the number of requests that the main memory must handle. This increases system throughput.

In more complex data processing systems, multiple levels of cache memory may be utilized. For example, an IP may be coupled to one or more levels of cache memory that are dedicated to storing only the data requested by that IP. An IP may be further coupled through its dedicated cache memories to one or more additional levels of cache memory that are shared between multiple IPs. This type of hierarchical memory structure is adapted to minimize the number of references that must be made to main memory for data, thereby increasing overall throughput.

While the use of cache memories increases system throughput, it causes other design challenges. When multiple cache memories are coupled to a single main memory for the purpose of temporarily storing data signals, some system must be utilized to ensure that all IPs are working from the same (most recent) copy of the data. For example, if a data item is copied, and subsequently modified, within a cache memory, another IP requesting access to the same data item must be prevented from using the older copy of the data item stored either in main memory or the requesting IP's cache. Additionally, if one IP updates a first, then a second portion of the memory, these updates must become visible to other IPs within the system in that order. This is referred to as maintaining cache coherency.

Maintaining cache coherency becomes more difficult and time consuming as more cache memories are added to the system since more copies of a single data item may have to be tracked. It is important to minimize the latency associated with performing these coherency actions so that updated data may be returned to a requesting IP as fast as possible. Otherwise, the benefits of the cache memory architecture may be negated by the overhead associated with managing the memory data.

For example, consider a shared cache memory that is coupled to multiple IPs through respective dedicated cache memories. The shared cache memory is further coupled directly or indirectly to a main memory, which may issue requests to the shared cache soliciting the return of data to the main memory. For instance, these requests may be issued so that some other IPs within the system can gain access to the requested data. To process the requests, the shared cache must determine whether it, or some other cache to which it is coupled, retains the most up-to-date copy of the data. This may involve searching multiple cache tag structures. In prior art systems, the order and manner in which these tag structures are searched are fixed in hardware. These aspects cannot be tuned according to system requirements and parameters in order to maximize system performance.

What is needed, therefore, is a system and method for managing a hierarchical memory in a way that can be tuned to achieve maximum throughput.

SUMMARY OF THE INVENTION

The current invention provides an improved memory control system and method. In one embodiment, the memory system includes a main memory coupled to multiple processing nodes. Each processing node may comprise a shared cache, one or more dedicated processor caches that may be coupled to the shared cache via a processor bus, and one or more requesters such as instruction processors. During instruction execution, the instruction processors first request data from their respective dedicated cache(s). If the data is not present in these caches, a request is forwarded to a shared cache. If the data is not resident in the shared cache, the data must be obtained from main memory.

Sometimes data requested from the main memory cannot be returned by the main memory until the most recent copy of that data is retrieved from another processing node. In these instances, the main memory issues a request to the other processing node soliciting return of the requested data. According to the current invention, when a processing node receives this type of memory request, the request may be handled in a manner that is determined by programmable control indicators.

In one embodiment, the programmable control indicators are set to select a shared-cache mode. In this mode, a request for memory is processed by first referencing the tag logic of the shared cache. If the tag information for the requested data indicates the request may be fulfilled without issuing a request to the dedicated caches, the requested data is retrieved from the shared cache and returned to the main memory. If, however, the tag information indicates that one of the dedicated caches may store an updated copy of the data, or that these caches retain one or more read-only copies of the data that must be invalidated to fulfill the request, a reference to these dedicated memories must be completed.

In another embodiment, the programmable control indicators select a processor-bus mode. In this mode, when the shared cache receives a request from main memory, it issues a request for this data to the dedicated cache memories irrespective of whether these cache memories store the requested data. While this request is being processed, the shared cache tag logic is referenced to determine whether the data is stored by the dedicated cache memories, and to further retrieve the data from the shared cache. If updated data is stored in one of the dedicated caches, this data is returned to the shared cache and forwarded to the main memory to fulfill the request. Otherwise, the data retrieved from the shared cache may be returned to the main memory.

In yet another "cache not present" mode, the control indicators indicate that the shared cache is not available for storing data. This may be the case either because the shared cache has been degraded after the occurrence of errors, or because the shared cache is a modular unit that is configured to include tag logic but not a memory for storing data. In this case, all memory requests for data are handled by updating the shared cache tag logic, and retrieving any updated data from the dedicated caches.

The mode of operation that is selected will depend on system parameters. In an embodiment wherein the system is modular and the user opts to omit the data memory within the shared cache, the system may operate in the cache-not-present mode. In another embodiment wherein the cache sizes are selectable, the mode selection may also depend on the system configuration. For example, if the shared cache is selected as being relatively large as compared to the dedicated cache memories, it is more likely a memory data request can be fulfilled without a reference to the dedicated caches. In this instance, operation efficiency may be improved by selecting shared-cache mode. However, as the relative size of the dedicated caches increases as compared to the shared cache, it becomes more likely that efficiency may be improved by switching to processor-bus mode. Other system parameters may affect this mode selection, including the mix of read versus write operations that are being executed by the instruction processors within a processing node.

In one embodiment of the invention, mode selection may be made using a programmable user interface such as a scan set interface. Alternatively, the operating system may alter the mode selection based on the types of software applications executing within a particular processing node. According to another aspect, mode switch logic is provided to monitor system conditions and alter the mode to optimize system performance. For example, if the system is operating in shared-cache mode and at least a predetermined percentage of memory requests require references to the dedicated cache memories, the mode is automatically altered to the processor-bus mode. Conversely, if the system is operating in processor-bus mode and a predetermined percentage of memory requests may be satisfied without a reference to the dedicated caches, the mode is automatically updated to the shared-cache mode. The predetermined percentages may, in one embodiment, be programmably selected.

According to yet another aspect, data may be provided by the main memory to a processing node before all memory coherency operations have been completed for the data. This generally involves a situation wherein data is provided to be updated by one of the requesters before all read-only copies of the data residing within the memory system have been invalidated. Providing data in this expedited manner increases system throughput. However, these situations must be tracked to ensure that memory incoherency does not result. For example, in this embodiment, data updated within a processing node cannot be returned to main memory until all incomplete coherency actions for that data, or other associated data, are completed. Therefore, in this embodiment, a circuit is provided to track all situations wherein data is provided to a processing node in this expedited manner.

Although the exemplary embodiments described herein include a shared cache that is coupled to one or more dedicated caches via a processor bus, those skilled in the art will appreciate that the invention may be applied to many other embodiments. For example, the invention may be adapted for use within any hierarchical or other memory structure wherein two coupled storage devices may store data that is requested by a third entity. The memory structure may include all dedicated caches, all shared caches, or a combination thereof. Moreover, the memory structure need not be coupled via a bus, but may instead utilize another manner of communication.

In one embodiment, a memory system is provided that comprises a first storage device, at least one additional storage device, and a control storage device to store a programmable indicator identifying the manner in which the first and the at least one additional storage device are to be referenced. The system further includes a control circuit coupled to the first storage device, the at least one additional storage device, and the control storage device. The control circuit receives a request for data. The requested data may be stored within either the first or the at least one additional storage device. In response to the request, the control circuit initiates at least one of a first reference to the first storage device and a second reference to the at least one additional storage device in a manner controlled by the state of the programmable indicator.

According to another aspect, a memory system is disclosed. The system includes first memory logic, at least one other memory, and a storage device coupled to the first memory logic to store a programmable indicator identifying a mode of referencing the first memory logic and the at least one other memory. A control circuit is coupled to the first memory logic and the at least one other memory to receive a request for data, and in response thereto, to retrieve the requested data from at least one of the first memory logic and the at least one other memory in a manner determined by the identified mode. In one embodiment, the first memory logic includes tag logic and a data memory. In another embodiment, the first memory logic includes tag logic only.

A method that may be employed in a data processing system is also described. The data processing system may include a first memory coupled to at least one other memory and a programmable storage device to identify a reference mode to control the manner in which data is retrieved from at least one of the first memory and the at least one other memory. The method includes the steps of receiving a request for data, and initiating an operation to retrieve the data from at least one of the first memory or the at least one other memory in a manner that is determined by the reference mode.

In yet another embodiment, a data processing system is disclosed that includes main memory means for storing data, and first cache means for storing a first sub-set of the data. The system includes second cache means for storing a second sub-set of the data, and programmable storage means for storing one or more control signals to control the way in which data is retrieved from the first cache means and the second cache means. The system further comprises control means for receiving requests for data from the main memory, and for initiating a reference to one or both of the first and second cache means based, at least in part, on the state of the one or more control signals.

Other scopes and aspects of the invention will become apparent to those skilled in the art from the following description and accompanying drawings.

DETAILED DESCRIPTION OF THE DRAWINGS

Figure 1:
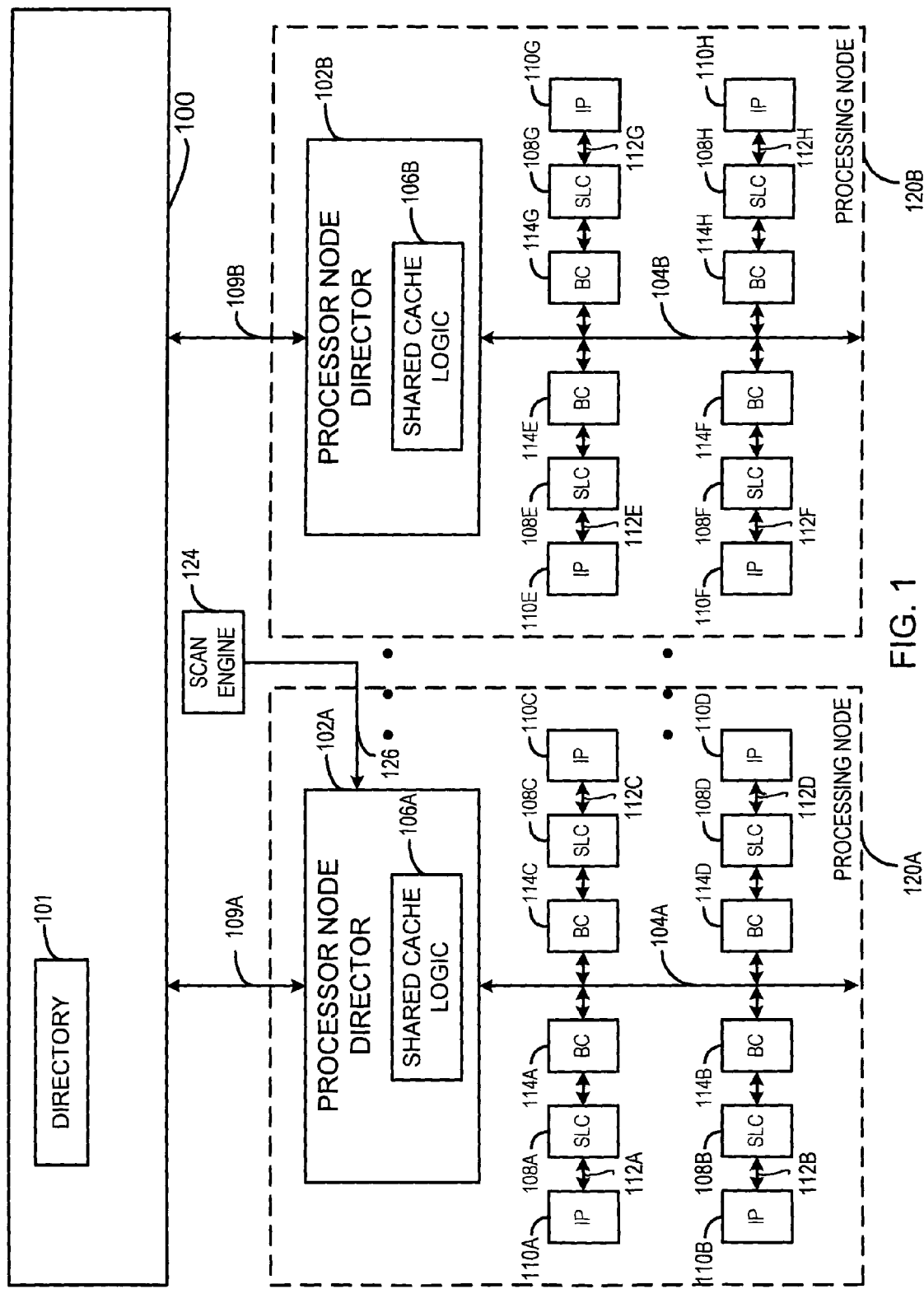
FIG. 1 is a block diagram of an exemplary data processing system of the type that may employ the current invention.

FIG. 1 is a block diagram of an exemplary data processing system that may employ the current invention. The system includes a Storage Coherency Director (SCD) 100 that provides the main memory facility for the system. SCD 100 may include random access memory (RAM), read-only memory (ROM), and any other type of memory known in the art. SCD 100 may be subdivided into multiple subunits (not shown) in a manner largely beyond the scope of the current invention. In one embodiment, SCD is a directory-based storage unit. In this embodiment, SCD retains information in directory 101 that indicates where the latest copy of requested data resides within the system. This is necessary since data from SCD 100 may be copied into any of the various cache memories within the system. Directory 101 tracks the latest copy of the data to ensure that every processor is operating from this copy. In the current embodiment, directory 101 includes a directory entry that tracks the location of each 128-byte block of memory within the SCD, where a 128-byte block is referred to as a cache line.

SCD is coupled to one or more Processor Node Directors (PND) shown as PNDs 102A and 102B. The system of the current invention may include more or fewer PNDs than are shown in FIG. 1. Each PND is coupled to SCD 100 over one or more high-speed SCD interfaces shown as 109A and 109B that each includes data, address, and function lines. For simplicity, each PND is shown coupled to SCD 100 over a single interface.

Each PND includes logic to interface to the high-speed SCD interface, and further includes logic to interface to a respective processor bus such as processor bus 104A or 104B. These processor buses can employ any type of bus protocol. Each PND may further include shared cache and all supporting logic, shown as shared cache logic 106A and 106B, respectively. This cache logic may include a Third-Level Cache (TLC), a Fourth-Level Cache (4LC), or some other type of cache memory.

As noted above, each of PNDs 102A and 102B is coupled to a respective processor bus 104A and 104B. Each processor bus further couples to multiple local cache memories through respective Bus Controllers (BCs). Each BC controls the transfer of data to and from the processor bus in a manner that conforms to bus protocol. In the current embodiment, Second-Level Caches (SLCs) 108A-108D are coupled to processor bus 104A through BCs 114A-114D, respectively. Similarly, SLCs 108E-108H are coupled to processor bus 104B through BCs 114E-114H, respectively. In another embodiment, these local caches may be Third-Level Caches.

Each SLC 108 is also coupled to a respective one of the Instruction Processors (IPs) 110A-110H over a respective interface 112A-112H. For example, SLC 108A is coupled to IP 110A via interface 112A, SLC 108B is coupled to IP 110B via interface 112B, and so on. An IP may be any type of processor such as a 2200™ processor commercially available from Unisys Corporation, a processor commercially available from Intel Corporation, or any other processor known in the art. Each IP may include one or more on-board caches. In the current embodiment, each IP includes a First-Level Cache (FLC). Preferably, each IP resides on a single Application Specific Integrated Circuit (ASIC) device with a respective SLC 108. Alternatively, an IP may be coupled to a respective SLC over an external interface. The associated BC may or may not be integrated with the SLC logic, and may also reside within the same ASIC.

A PND, its respective processor bus, and the entities coupled to the processor bus may be referred to as a "processing node". In the current example, PND 102A, processor bus 104A, and all entities associated with processor bus including BCs 114A-114D, SLCs 108A-108D, and IPs 110A-110D may be referred to as processing node 120A. Similarly, PND 102B, processor bus 104B, and all entities associated with processor bus 104B comprise a second processing node 120B. Other processing nodes may exist within the system.

The system of FIG. 1 may further include a scan engine 124 coupled to a scan interface 126. Scan interface 126 is shown coupled to PND 102A for simplicity, but it will be understood this scan interface would generally be coupled to many units within the system. In one embodiment, scan interface provides serial scan capabilities, as is known in the art. Scan engine is capable of performing read and write operations via scan interface 126 to various storage devices within the system before, or during, normal system operation. These read and write operations may be performed to initialize logic, diagnose and recover from error conditions, and change the setting of various mode switches, as will be discussed further below.

During execution, an IP is accessing programmed instructions and data from SCD 100 and its respective caches. For example, when IP 110A requires access to a memory address, it first attempts to retrieve this address from its internal cache(s) such as its FLC. If the requested address is not resident in the FLC, a request is sent to the respective SLC 108A. If the requested data is likewise not resident within the SLC, the SLC forwards the request to the processor bus 104A.

In one embodiment, all SLCs on a processor bus implement a snoop protocol to monitor, or "snoop", the processor bus for requests. In the current example, SLCs 108B-108D snoop the request provided by SLC 108A on processor bus 104A. If any of these SLCs has a modified copy of the requested cache line, it will be returned to requesting SLC 108A via processor bus 104A. Additionally, SLCs 108B-108D may have to invalidate any stored copies of the data depending on the type of request made by SLC 108A. This is discussed further below.

PND 102A also snoops the request from SLC 108A. PND 102A determines whether shared cache logic 106A stores the most recent copy of the requested data. If so, the data will be provided by PND 102A to SLC 108A.

In some instances, data requested by IP 110A is not resident within any of the cache memories associated with processor bus 104A. In that case, PND 102A must forward the request to SCD 100. SCD 100 determines the location of the current copy of the requested data using information stored within its directory 101. The most current copy may reside within the SCD itself. If so, the SCD provides the data directly to PND 102A.

In some cases, requested data is stored within a cache memory of a different processing node. In this instance, the way in which the request is handled depends on the type of request made by IP 110A, and the type of access rights that have been acquired by the other processing node. If IP 110A is requesting "ownership" of the data such that a write operation can be performed, and further if another processing node 120 currently retains ownership of the data, the SCD issues a "port snoop and invalidate" request. This request will cause the processing node to invalidate any stored data copies, and return updated data to SCD 100 so that this updated copy may be forwarded to PND 102A.

In another situation, the IP 110A may be requesting ownership of data that is retained with read-only access rights by one or more other processing nodes 120. In this situation, an invalidation request is issued to these one or more processing nodes. An invalidation request causes a processing node to invalidate its copies of the data so that the data may no longer be used.

In still another scenario, IP 110A may be requesting read-only access to data that is retained with ownership privileges by another node. In this case, SCD 100 issues a "port snoop" request to the other processing node. The other node may relinquish all access rights when returning the data, or, in some instances, may retain a read-only copy. The determination of whether to retain a read-only copy is largely beyond the scope of the present invention.

In any of the foregoing scenarios, SCD 100 issues an appropriate request to one or more processing nodes 120. Each request is received by the PND of the processing node. In response to such a request, the PND may issue a request on the respective processor bus 104 to prompt return of any modified data. Based on the particular scenario, this request may also result in invalidation of the stored copy, or the conversion of that copy to read-only data. Any updated data will be returned to SCD 100.

In prior art systems, the manner in which the PND handles a data request from SCD 100 is fixed. For example, PND may first determine whether the most up-to-date copy of the data resides within shared cache logic 106. If not, the request is issued to the associated processor bus for handling by the SLCs. In some cases, however, this is not the most efficient course of action. For example, certain system characteristics may dictate that more efficient processing will occur if a request is issued to the processor bus at the same time, or even before, a reference to shared cache logic is performed. This will be discussed further below in reference to FIG. 2.

Figure 2:
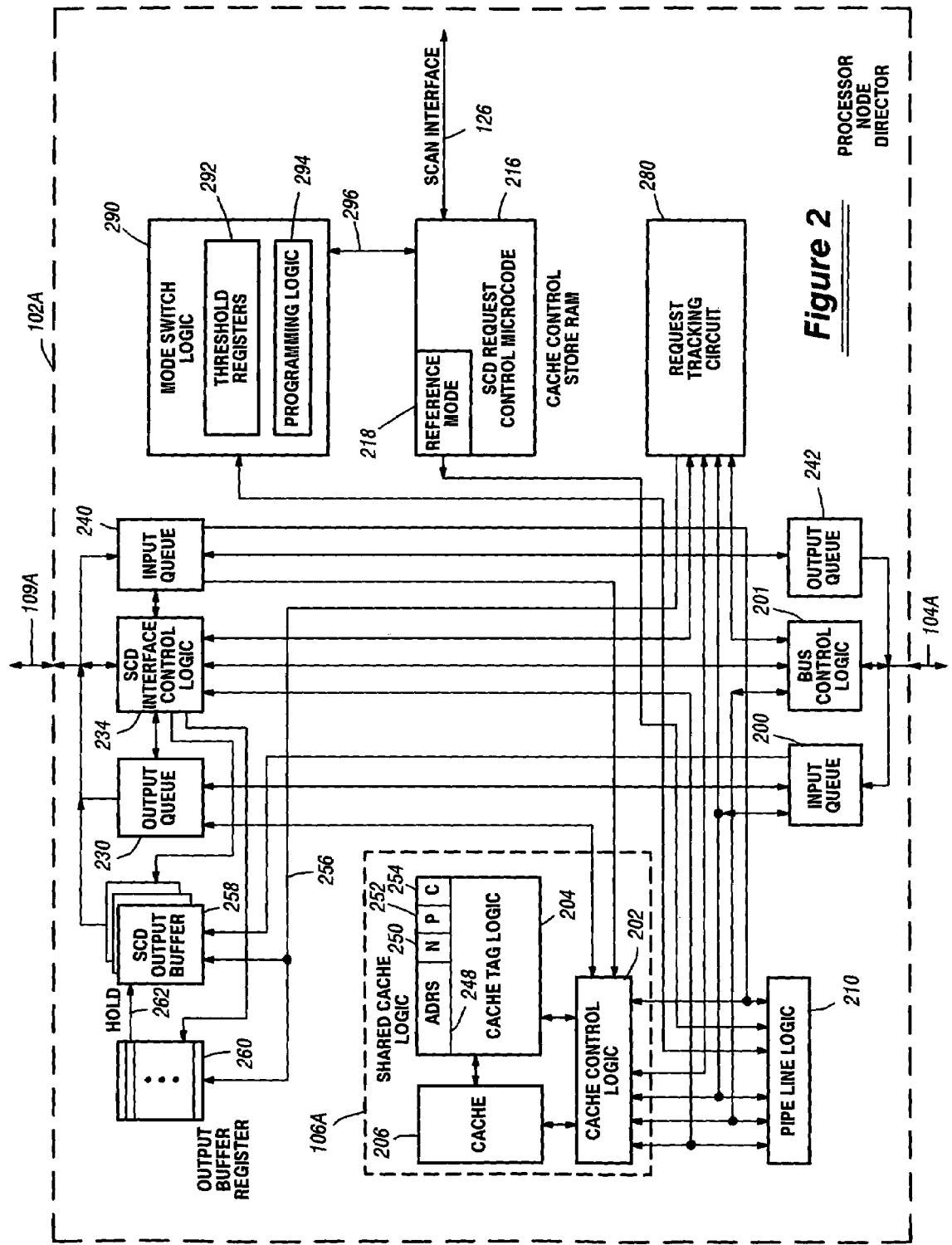
FIG. 2 is a block diagram of one embodiment of the current invention that is adapted for use within a data processing platform similar to that of FIG. 1.

FIG. 2 is a block diagram of logic within a PND 102 according to the current invention. Although PND 102A is shown and described, it will be understood that this discussion applies to any other PND as well. PND 102A includes shared cache logic 106A, which manages and stores data requested by the IPs residing on processor bus 104A. Shared cache logic 106A comprises a cache memory 206, and cache tag logic 204 to store tag information describing the data residing within cache memory, as is known in the art. Shared cache logic further includes cache control logic 202, which provides the control circuitry for referencing cache tag logic 204 and cache 206.

As mentioned above, cache tag logic 204 stores tag information for any data that is retained within processing node 120A. In the current example, cache control logic 202 will reference the tag information for the requested cache line, which includes a partial cache line address in address field 248.

In one embodiment, cache 206 is a four-way set associative cache. Each of the four blocks in a set stores a cache line of data. A least-recently used algorithm is employed to determine which of the four blocks within a set will be replaced. The tag information stored by cache tag logic 204 includes an encoded value for each of the four blocks indicating whether a particular block is either the oldest, or the newest, block in the set. This encoded value is updated each time a cache line is stored to a block of a set.

The tag information further includes a node indicator "N" 250 that records the type of access rights that have been granted to the processing node for the data. Such access rights may include exclusive ownership, indicating that the processing node has the right to both read and update the data. The rights may instead be limited to read-only privileges. In another case, node indicator "N" may indicate that the data is invalid such that a valid copy of the data no longer resides within the processing node.

In addition to the node indicator 250, cache tag logic may further include a multi-bit processor bus indicator, "P", 252 that tracks the type of access rights retained by the various SLCs and FLCs coupled to processor bus 104A. For example, if the data has been provided with ownership to one of the SLCs on processor bus 104A, the processor bus is said to have exclusive ownership of the data. This means the most up-to-date copy of the data does not necessarily reside within cache 206, but instead may reside within one of the SLCs 108. In another instance, indicator 252 indicates that processor bus 104A is guaranteed to have a modified copy of the data as compared to the copy stored within cache 206. In yet other cases, the indicator may record that processor bus 104A retains a read-only copy of the data such that one or more of the SLCs store the data with read-only privileges. Finally, the processor bus indicator may record that none of the SLCs retains a copy of the data, and the only valid copy is retained within cache 206.

In one embodiment, cache tag logic further includes a multi-bit cache indicator, "C", 254 to record the state of the data within cache 206. For example, the data may be designated as having been modified, meaning an updated copy of the data is stored within cache 206. In contrast, it could be listed as residing within cache in the unmodified state. It may further be indicated as "not present", meaning the only copy of the data within processing node 120A resides within one of the SLCs 108 and the associated IP. In still another embodiment, this indicator may indicate that cache 206 is not available for use. In this embodiment, the data processing system of FIG. 1 does not utilize shared cache logic 106A, and any requests received by a PND 102 from a processor bus 104 are forwarded directly to SCD 100 for processing.

Shared cache logic 106A is coupled to pipeline logic 210, which is a logic sequencer for scheduling and handling requests received from processor bus 104A, or from SCD 100 on interface 109A. Pipeline control logic provides the control signals that cause cache control logic 202 to initiate references to cache 206.

Pipeline control logic operates under the control of programmable control signals stored within cache control store RAM 216. Any other type of read/write storage device may be used in the alternative to implement this control store. The programmable control signals that are stored within cache control store RAM include a reference mode indicator 218. This indicator may be programmed using scan engine 124 and scan interface 126, as will be described further below.

Requests for data are provided to, and received from, SCD 100 on interface 109A. Requests for data received from SCD 100 are stored within input queue 240 prior to being processed under the control of pipeline logic 210. When a request enters pipeline logic 210, the request may prompt pipeline logic 210 to issue a request for the data to processor bus 104A via output queue and bus control logic 201.

Any updated data returned on processor bus 104A as a result of the request is stored within input queue 200. In some cases, pipeline logic 210 may initiate a cache reference to cause cache control logic 202 to store this data in cache 206 and update tag information within cache tag logic 204. This updated data will generally also be transferred to output queue 230 to be returned to SCD 100 via interface 109A. In some cases, the updated data cannot be returned to the SCD immediately because of conflict situations to be discussed below. In those cases, the data must be temporarily retained in an available one of SCD output buffers 258 until the conflict situation is resolved. Data stored within output buffer registers 260 controls the SCD output buffers. Details associated with these types of operations are discussed below.

Logic included within PND 102A may be implemented using one or more ASICs. For example, in one embodiment, cache 206 is implemented in a separate ASIC to allow for a memory of sufficient size. Another ASIC is used to implement the remainder of the PND logic. This provides a modular system that allows caches of various sizes to be selected for use within the system in a plug-and-play manner. In one embodiment of the system, cache 206 may be omitted entirely such that all memory requests provided on processor bus 104A are forwarded to SCD 100. In this embodiment, state bits stored within cache tag logic 204 indicate that cache 206 is not available for use. This will be discussed further below.

PND 102A further includes a request tracking circuit 280. This logic is used to track requests that are issued by the PND 280 to SCD 100. In particular, when PND 102A makes a request to read or write data to SCD 100, an entry is created within request tracking circuit. This entry will match each request that is issued to the SCD with a response from the SCD. This match is performed using a transaction identifier that is transmitted with the request, and returned with the associated response.

In addition to tracking requests and responses in the foregoing manner, request tracking circuit 280 is further employed to ensure that memory coherency is maintained within the system. As discussed above, maintaining memory coherency involves ensuring that each processor in the system is working from the same, most-recent copy of any data. Further, if a processor updates a first, then a second, portion of the memory, these updates must become visible to other IPs within the system in that same order.

Some types of storage operations may result in situations that could cause memory coherency problems. For example, assume that SCD 100 provides data to processing node 120A for update purposes before read-only copies of that data that are retained by other processing nodes have been invalidated. This may be done to increase system throughput by allowing processing node 120A to commence processing activities in an expedited manner. At approximately the time the data is provided to processing node 120A, the SCD also issues requests to invalidate the read-only copies. Next, assume that processing node 120A updates portions of the data and sets a flag to indicate that this updated data is ready for use by the other processing nodes. Processing node 120A then stores the updated data and flag back to SCD 100. The other processing nodes read the flag indicating the updated data is available for use. However, if the invalidate requests from SCD have not yet been processed, these other processing nodes may utilize the old copies of the data rather than the updated data copy. Memory incoherency will result.

To prevent the type of situation described above, a processing node that receives data for update purposes before all read-only copies have been invalidated cannot return that data to the SCD before pending invalidation operations have been completed for this, and for certain associated, data. This associated data includes data that was requested from SCD 100 by any processor within the processing node that may have accessed the received data. This associated data is limited to that data retained by the processing node for which invalidation operations remain pending at the time the received data is stored within cache 206 or one of the SCD output buffers 258 for potential transfer to the SCD 100. This is largely beyond the scope of the current invention, and is described in detail in commonly-assigned patent application entitled "Data Acceleration Mechanism for a Multiprocessor Shared Memory System", filed on Jun. 20, 2003, and which is incorporated by reference in its entirety.

For purposes of the current invention, it is sufficient to note that, for each processing node 120, the completion of invalidation operations for any data retained by that processing node is signaled by acknowledgements provided by SCD 100 to that node. Each processing node includes a request tracking circuit 280 that tracks all pending invalidation operations, as well as the associated acknowledgements, for that node. In addition, when any data that is associated with outstanding invalidation operations is stored to cache 206, request tracking circuit 280 creates an entry to record that this data is associated with a "coherency conflict". Coherency conflicts are not cleared until the associated outstanding coherency operations are completed. This tracking mechanism is used by pipeline logic 210 to ensure that updated data is not returned by SCD 100 until all appropriate invalidation operations that may affect memory coherency have been completed.

With the foregoing overview of the system of FIG. 2 available for discussion purposes, a more detailed description of the operation of the invention is now considered. As discussed above, SCD 100 may issue requests to PND 102A on interface 109A for return of data. These requests are issued because IPs within other processing nodes 120 are requesting access to data retained by processing node 120A.

Requests received from SCD 100 are temporarily stored within input queue 240. At predetermined intervals, a pending request can be transferred from input queue 240 to pipeline logic 210 for processing. These requests will be handled in a manner determined by programmable reference mode indicator 214 stored within cache control store RAM 216.

Reference mode indicator 214 can be set to select a "shared-cache mode", a "processor-bus mode", or a "cache-not-present mode". In shared-cache mode, pipeline logic 210 will reference cache tag logic 204 to determine whether the SCD request can be fulfilled without making a reference to processor bus 104A. If the request cannot be completed solely with a reference to cache 206, a reference is initiated to processor bus 104A for the data. In contrast, when reference mode indicator 214 is set to processor-bus mode, pipeline logic 210 initiates a request to processor bus 104A to retrieve shared data before a reference to cache tag logic 204 is completed. Finally, if the reference mode indicator is set to cache-not-present mode, cache 206 is not available for use, or is not included within the system at all. In this mode, data requested by SCD 100 must be retrieved from processor bus 104A. Each of these modes is considered in turn in the following paragraphs.

Processor-Bus Mode

First, processor-bus mode is considered. When reference mode indicator 218 is set to this mode and an SCD request for data enters pipeline logic 210, pipeline logic causes bus control logic 201 to perform bus arbitration to gain access to processor bus 104A. When access to the bus is acquired, bus control logic 201 initiates a request for the data, which is snooped by BCs 114A-114D, and thereafter forwarded to the respective SLCs 108A-108D for processing. If any of the SLCs stores an updated copy of the requested data, that copy may be invalidated, and the updated copy will be returned on processor bus 104A. The determination as to whether to invalidate the data copy is made based on the type of access rights requested, and, in some cases, on conditional logic within SLC 108. For example, in some cases wherein the request is soliciting read-only access rights, an SLC 108 that is returning the data may determine that a read-only copy will be retained. This is largely beyond the scope of the current invention. It is sufficient to note that the updated data will be returned with an indication as to which access rights, if any, are being retained.

When operating in processor-bus mode, bus control logic 201 will snoop the request from processor bus 104A so that it will be read into input queue 200. The request will be provided to pipeline logic 210, which will prompt cache control logic 202 to reference cache tag logic 204.

While cache control logic 202 is making a reference to cache tag logic 204 for the requested data, pipeline logic 210 references request tracking circuit 280 to determine whether any coherency conflicts exist for the current data. As discussed above, this involves determining whether all invalidation operations have been completed for this, or any related data. The completion of these invalidation operations will be signaled by acknowledgement(s) received from SCD 100.

If no coherency conflicts exist for the data, cache control logic 202 updates the node indicator "N" 250 to an invalid state, indicating the processing node does not retain a valid copy of the data. This is done in preparation to return the data to SCD 100. Then, if the tag information indicates the data resides within cache 206, this data is retrieved. If an updated copy of this data is returned on processor bus 104A to input queue 200, the data copy retrieved from cache 206 is discarded, and the updated data is transferred to output queue 230. Otherwise, the retrieved copy is sent to output queue 230. This data will be provided to SCD 100 on interface 109A.

In some cases, request tracking circuit 280 determines that some invalidation operations are pending for the data such that a coherency conflict exists. In these instances, if a cache hit occurs for the data, any updated data that was returned on processor bus 104A is stored back to cache 206. If a cache miss occurs, a replacement operation will be scheduled.

As discussed above, in one embodiment, cache 206 is a four-way set associative cache that employs a least-recently used algorithm. This algorithm will first attempt to store the updated data in an unused block in the appropriate cache set. If an unused block is not available, cache control logic 202 will attempt to replace the oldest block in the set with the updated data returned on processor bus 104A. This replacement operation can be completed if this oldest block is not associated with a coherency operation. In this case, the data returned on processor bus is stored to cache 206 and the cache line stored within the oldest block is returned to the SCD.

When a replacement operation is performed in the manner discussed above, a record is created within request tracking circuit 280 that prevents the updated data from being transferred from cache 206 back to SCD 100 until all associated coherency actions are completed. A complete discussion of this data tracking and management procedure is provided in the commonly-assigned co-pending patent application entitled "Data Acceleration Mechanism for a Multiprocessor Shared Memory System" referenced above. In this case, node indicator "N" will not be set to record that the data is invalid until the data is transferred to SCD.

In still other cases, request tracking circuit 280 determines that updated data returned on processor bus 104A cannot be returned to SCD 100 because some invalidation operations are pending for the data. However, this updated data cannot be replaced within cache 206 because an unused cache block is not available, and the oldest block in the set is associated with a coherency conflict. In this instance, the updated data is transferred from input queue 200 to one of the SCD output buffers 258. Request tracking circuit 280 stores control bits in a corresponding one of output buffer registers 260. These control bits reflect the coherency conflicts that currently exist for the data. As long as these coherency conflicts exist, a hold signal is asserted on line 262 to prevent the data stored within SCD output buffers from being transferred to SCD 100.

Eventually, one or more responses will be received from SCD 100 indicating the coherency conflicts have been resolved. Request tracking circuit will clear the control bits stored within the corresponding one of output buffer registers 260, thereby allowing the data stored within SCD output buffer 258 to be transferred to SCD 100.

Finally, is still other instances, processing node 102A may not store the requested data. This may occur because the processing node invalidated a previously retained read-only copy of the data without informing the SCD 100. This may further occur if updated data was in transit to the SCD at the time the request for return of the data was issued by the SCD. This is possible in an embodiment of the invention that provides response and request channels within the SCD, as is discussed in the co-pending patent application entitled "Programmable Cache Management System and Method" that is referenced above. In either of these instances, the data will not be returned on processor bus 104A, and will likewise not be retrieved from cache 206. An indication that the processing node does not retain the data will be provided to SCD.

The foregoing discussion relates to the processing of SCD requests for data when reference mode indicator 218 is set to processor-bus mode. In this case, a request for data that is received by PND 102A from SCD 100 will be transferred from pipeline logic 210 to output queue and processor bus 104A before a reference to cache tag logic 204 is completed. In contrast, when reference mode indicator is set to shared-cache mode, a reference to cache tag logic 204 is initiated before any request is made to processor bus 104A. This is discussed in the following paragraphs.

Shared-Cache Mode

When a request for data is received from SCD and reference mode 218 is set to shared-cache mode, pipeline logic 210 initiates a request to cache control logic 202. Cache control logic references the tag indicators in cache tag logic 204 to determine whether the request can be completed without making a reference to processor bus 104A.

Data can be returned without a reference to processor bus if a hit occurs to cache 206, and "P" indicator 252 indicates that none of the SLCs 108 on processor bus 104A retains a copy of the data. Additionally, data can be returned without making a request to processor bus if one or more of the SLCs retains a read-only copy of the data, and that copy need not be invalidated to fulfill the SCD request. This may occur, for example, if the SCD is only requesting a read-only copy of the data.

In contrast to the foregoing, a SCD request cannot be fulfilled without a reference to the processor bus if the "C" indicator 154 indicates the requested data is not stored within cache 206. In this case, a request for the data must be issued to processor bus. Similarly, the "C" indicator may reflect that the requested data is stored within cache 206, but the "P" indicator 252 indicates that the processor bus either has ownership, or is guaranteed to have an updated copy, of the requested data. In either of these circumstances, a request for data must be issued to processor bus 104A to obtain any updated copy of the data that may reside within one of SLCs 108A-108D.

In yet another instance, if the requested data is stored within cache 206 as indicated by the "C" indicator, if "P" indicator 252 records that processor bus has a shared copy of the data, and if invalidation of this shared copy is necessary to complete the request, a processor bus request must be issued. This request is required to invalidate the data copy stored within one or more of the SLCs 108, even though the data that will be returned to the SCD will be retrieved from cache 206. In all of the foregoing cases, a request to processor bus 104A must be completed before data is returned to SCD 100.

Finally, in one embodiment, cache 206 is non-inclusive. As a result, when cache tag logic 204 is referenced, a tag entry may not exist for the data even though that data is stored within the dedicated cache(s) of one or more of the processors within the processing node. In this case, a request must be issued to processor bus to prompt the return of updated data, and/or cause one or more processors to relinquish access rights.

While cache control logic is referencing the cache tag logic 204 to determine whether a cache miss occurred and, if applicable, to retrieve the state of the tags, request tracking circuit 280 determines whether coherency conflicts exist. If not, and if the data may be retrieved from cache 206 without a reference to the processor bus, the data is retrieved and provided to output queue 230 for transfer to SCD 100. If any pending coherency operations are associated with the cache line, as indicated by a record stored within request tracking circuit 280, the data will not be transferred to output queue 230 immediately. Instead, this transfer of data will be initiated by request tracking circuit 280 when all outstanding coherency operations associated with the data have been completed. This is discussed above, and in the co-pending application referenced above.

In another scenario, when cache control logic 202 references the tag information, the cache tags indicate a request to processor bus 104A is necessary to complete the request. Therefore, pipeline logic 210 signals bus control logic 201 to arbitrate for processor bus. When access to the bus is obtained, bus control logic 201 and output queue 242 issue the request for the data. Depending on the type of access rights requested by SCD 100, this request may indicate that any copies of the data stored by one or more of the SLCs must be invalidated. If any of the SLCs 108 stores an updated copy of the data, that data is returned to input queue 200 on processor bus 104A. This updated data copy will be returned to SCD instead of any data retrieved from cache 206.

In the manner discussed above, any data returned on processor bus 104A cannot be provided to SCD if any coherency operations are pending, as indicated by request tracking circuit 280. If such operations are pending, the cache tags are updated within cache tag logic 204, and the updated data that was returned on processor bus is stored to cache 206, assuming the data can be replaced within the cache because an available block exists or because the oldest block in the set is not associated with coherency conflicts.

As discussed above, after the data returned on the processor bus is stored within cache 206, that data cannot be transferred from cache 206 to SCD 100 until all coherency operations are completed, as determined by request tracking circuit 280. At that time, request tracking circuit 280 will cause this data to be transferred from cache 206 to output queue 230 so that it can be provided to SCD 100 in response to the SCD request.

As described above, in some instances, data returned on processor bus 104A cannot be stored to cache 206 because an unused cache block is unavailable within the appropriate cache set, and further because the oldest block in that set is associated with a coherency conflict. In this instance, the data is transferred from input queue 200 to one of the SCD output buffers 258. Request tracking circuit 280 stores control bits in a corresponding one of output buffer registers 260. These control bits reflect the coherency conflicts that currently exist for the data. Data will not be transferred to SCD until these coherency conflicts clear.

Finally, in another situation, processing node 102A may not store the requested data in any of its caches, as was discussed above. In this case, an indication to this effect will be returned to SCD without the data.

Cache-Not-Present Mode

In yet a third mode of operation, reference mode indicator 218 indicates that cache 206 is not available for use. This may occur either because the cache has been degraded following the occurrence of non-recoverable faults, or because the cache is not available at all. For example, in a modular system wherein cache 206 is implemented in a different ASIC as compared to the other PND logic, some customers may select a system that does not include cache 206. In this instance, the cache-not-present mode is utilized.

Cache-not-present mode is similar to processor-bus mode. Specifically, when a request from SCD is received in input queue 240 and subsequently enters pipeline logic 210, pipeline logic causes bus control logic 201 to perform bus arbitration to gain access to processor bus 104A. When access to the bus is acquired, bus control logic 201 initiates a request for the data, which is snooped by BCs 114A-114D, and thereafter forwarded to the respective SLCs 108A-108D for processing. If any of the SLCs stores an updated copy of the requested data, that copy may be invalidated, and the updated copy will be returned on processor bus 104A. As discussed above, the determination as to whether to invalidate the data copy is made based on the type of access rights requested, and, in some cases, on conditional logic within SLC 108.

Any updated copy of the data that is retained by one of the SLCs will be returned on processor bus along with an indication as to which access rights, if any, are being retained by the SLC 108. In some cases, the request may indicate that all access rights must be relinquished, as described above. The data is stored within input queue.

While the request is being processed by the SLCs, request tracking circuit 280 determines whether any coherency conflicts exist for the data. If so, the data is stored to an available one of SCD output buffer 258 to await the clearance of these conflicts. When the conflicts are cleared, as will be indicated by control bits stored within a corresponding one of output buffer registers 260, this data will be stored back to SCD 100. If no updated data was returned on processor bus 104A, indicating that processing node 120A did not retain the data, this indication is returned to SCD 100 without data.

As may be appreciated from the above discussion, the way in which SCD requests are handled by a PND depends on many factors, including the reference mode setting, the state of the tag indictors 250, 252, and 254, and on the type of access rights that are requested by the SCD. In one embodiment, the actions that are to be taken in response to a given situation are encoded in programmable microcode bits stored within cache control store RAM 216. For example, these bits, which are shown as SCD request control microcode, govern whether a request will be issued, and if so, which type will be issued, to processor bus for any combination of the above-described factors. This provides system flexibility by allowing the request handling mechanism to be programmably modified as components within a modular-type system are altered.

The foregoing describes several alternative modes for obtaining data in response to a request from SCD 100. The mode of operation is selectable based on user requirements. For example, cost-savings may be obtained by purchasing a configuration that does not include cache 206. In this case, the system is configured to run in cache-not-present mode. This mode may also be selected following the occurrence of faults.

When comparing shared-cache mode to processor-bus mode, each has advantages that are situation dependent. For example, in those circumstances wherein requested data can be retrieved directly from cache 206 without making a reference to processor bus 104A, the request can be fulfilled more quickly using shared-cache mode. This is because in this mode, pipeline logic 210 causes cache control logic 202 to initiate a request to cache tag logic 204 without the delay associated with performing arbitration on processor bus 104A and snooping the request into input queue 200 so that the request is initiated to shared cache logic 106A. In contrast, in those situations wherein a request must be issued to processor bus 104A before the request can be completed, it is more efficient to operate in processor-bus mode. This is because the request is issued to processor bus without the latency associated with first referencing cache tag logic 204. The reference to cache tag logic that is needed to invalidate the data can be completed while the operation to processor bus 104A is occurring.

The state of reference mode indicator 218 can be set to optimize performance based on system parameters. For example, as the size of one or more of SLCs 108 is increased, it becomes more likely that the most current data copy will reside within one of these caches rather than within cache 206. Increasing the size of first-level caches coupled to the IPs can have a similar effect, assuming the SLCs are non-inclusive. In either of these cases, it becomes increasingly advantageous to operate in processor-bus mode rather than in shared-cache mode. Conversely, if the size of cache 206 is increased relative to the size of the SLCs, it becomes less likely that a processor bus reference is required, and more likely that the most up-to-date data copy will reside within cache 206. In this case, it becomes more advantageous to operate in shared-cache mode.

The type of software applications being executed by the various IPs on processor bus 104A may also contribute to the determination as to which mode of operation will provide optimum throughput. For example, if the majority of IP memory references are associated with reading data from memory, it becomes less likely that an updated copy of data will reside within an SLC 108 instead of shared cache. Therefore, it becomes less likely that a processor bus reference will be required to satisfy a data request from SCD 100. In this situation, it is generally advantageous to operate in shared-cache mode. However, if most IP references are associated with memory write operations such that it becomes more likely an updated data copy is stored within an SLC 108, it is advantageous to transition to processor-bus mode.

In one embodiment of the invention, reference mode indicator 218 may be programmed by scan engine 124 via scan-set interface 126. This scan interface may be used to perform serial scan operations as is known in the art. According to one aspect of the invention, the state of the reference mode indicator 218 may be modified dynamically without stopping clocks to PND 102A, or without halting normal operations. The reference mode may be selected at system initialization, and may be modified any time thereafter.

The reference mode may be altered as system parameters dictate. For example, in one embodiment of the invention, the system of FIG. 1 is modular. Various models of IPs 110, SLCs 108, BCs 114, PNDs 102, and SCDs may be interchanged within the system in a plug-and-play manner. Additionally, according to one aspect, processor bus 104A may utilize a different bus protocol as compared to processor bus 104B, and so on. Therefore, depending on the various cache sizes and processor bus speeds within a given processing node, the reference mode of a particular PND 102 may be selected to optimize throughput for that node. In this manner, all PNDs within the system need not be programmed to the same reference mode.

According to one aspect of the invention, reference mode indicator 218 may be set by a scan operation initiated by the operating system. The mode selection may be made based on the applications that are running on the various IPs at a given time. In one embodiment, each software application that may be executed by the system may be assigned a rating that indicates the mix between read and write accesses that will be performed while that application is executed. The OS utilizes the rating of all applications being executed by the various IPs within the same processing node to determine an overall rating indicative of the mix of operations occurring on the processor bus of that node. This overall rating may then be used to determine the appropriate state for reference mode indicator 218.

In another embodiment, pipeline logic 210 is coupled to mode switch logic 290. Mode switch logic 290 may be selectably enabled via scan-set interface 126. Mode switch logic 290 tracks the number of requests that are made to processor bus 104A as compared to the overall number of SCD data requests received by PND 102A. If the number of requests issued to the processor bus exceeds a predetermined threshold value, and if the mode is set to shared-cache mode, mode switch logic automatically re-programs reference mode indicator 218 to processor-bus mode. Conversely, mode switch logic tracks the number of SCD requests that can be satisfied without making a request to processor bus 104A. If that number reaches a second predetermined threshold value while reference mode indicator 218 is set to processor-bus mode, mode switch logic re-programs the reference mode indicator to shared-cache mode.

The threshold values used by mode switch logic 290 could be stored within programmable registers 292 that are programmed by scan engine 124 and scan-set interface 126. In one embodiment, the threshold values measure the number of references of a particular type that occur within a predetermined number of overall SCD requests. In another embodiment, the threshold values measure the number of references of a particular type that occur within a predetermined time. Other type of measurements can be devised to control and measure the mix of references occurring on processor bus so that the appropriate mode selection may be achieved.

Figures 3, 3A:
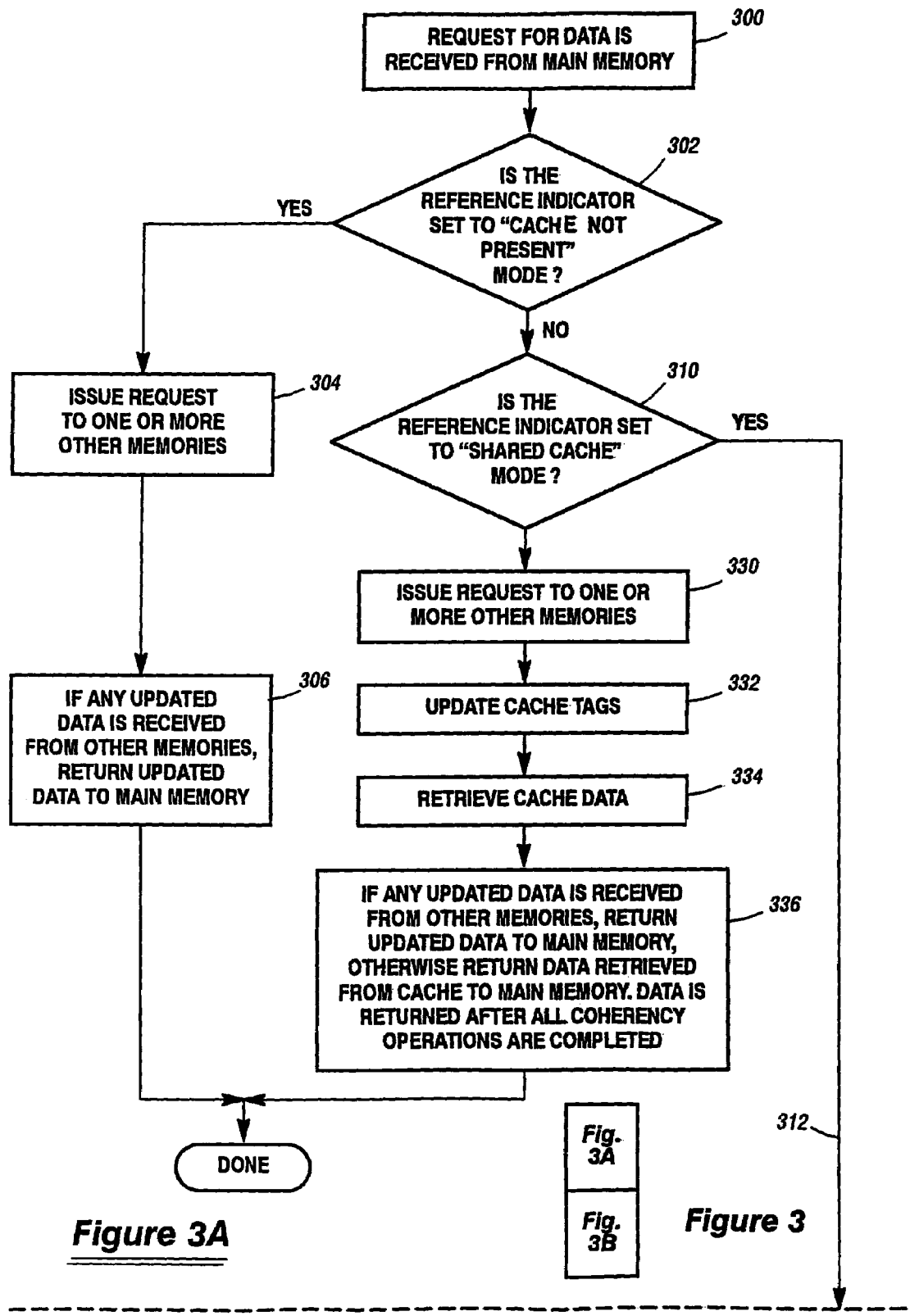
FIGS. 3A and 3B, when arranged as shown in FIG. 3, are a flow diagram illustrating one method of using the reference mode indicator.
Figure 3B:
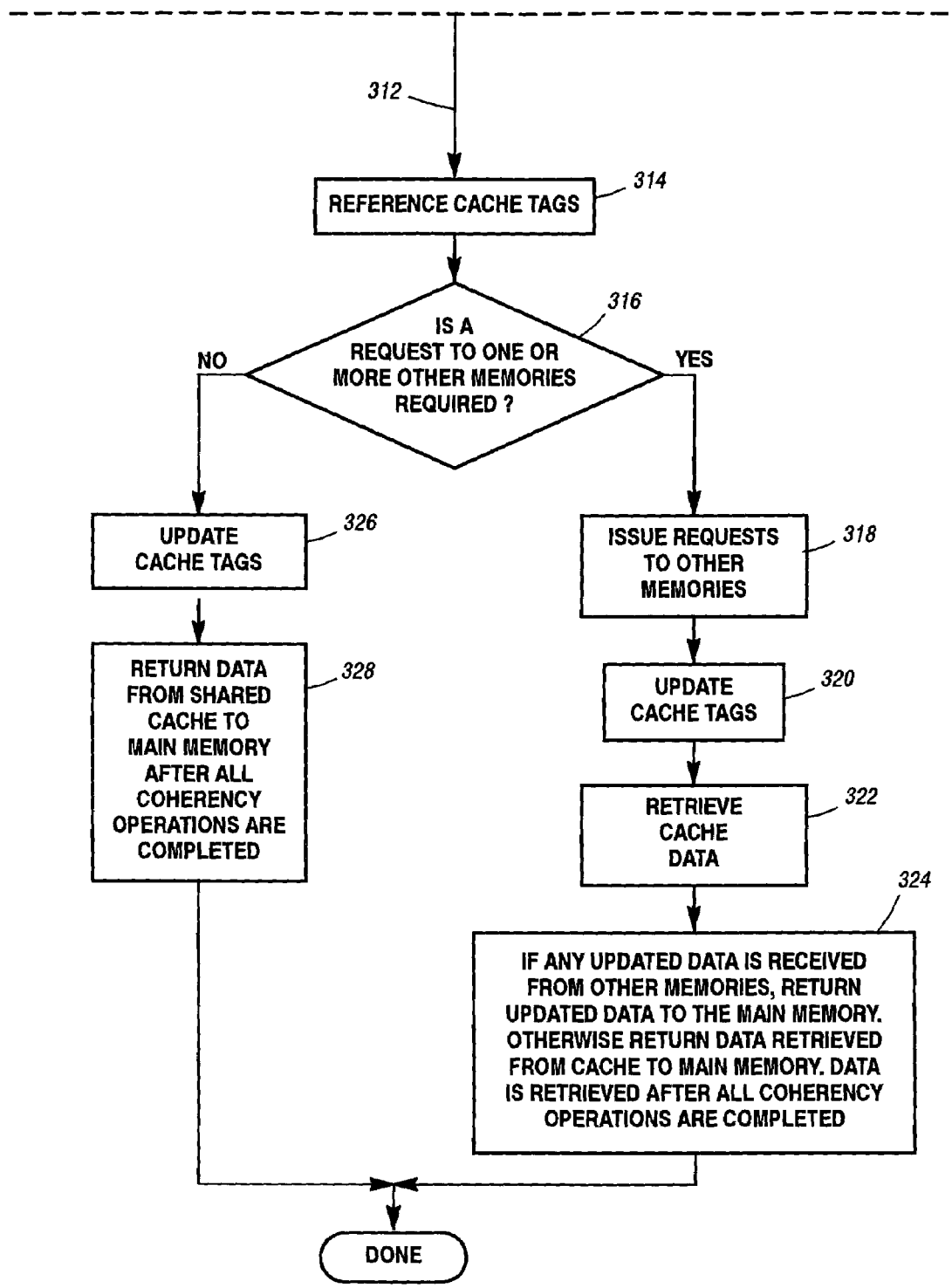

FIGS. 3A and 3B, when arranged as shown in FIG. 3, are a flow diagram illustrating one method of utilizing reference mode indicator 218 according to the current invention. In step 300, a request for data is received from main memory, which in the system of FIG. 1 is SCD 100. If reference indicator is set to "cache not present" mode (302), a request is issued to one or more other memories (304). In the current embodiment, this involves issuing a request to SLCs 108 via processor bus 104A. However, in other embodiments, this may involve issuing a request to one or more other storage devices that are directly or indirectly coupled to PND in some manner besides a processor bus. If any updated data is received from the other memories, the data is returned to main memory (306).

If reference indicator 218 is not set to "cache not present" mode (302), but is instead set to shared-cache mode (310), processing continues to FIG. 3B, as indicated by arrow 312. A reference is made to cache tag logic (314) to determine whether a reference to one or more other memories is required to complete the request (316). Recall this may be necessary for a variety of reasons, including the situation wherein the shared cache does not store the requested data. If this is the case, or if a cache miss results, a request must be issued to the one or more other memories (318).

While the request is pending to the one or more other memories, the cache tags are updated to the new tag state (320). This may involve invalidating the cache line associated with the requested data, or changing the access privileges granted to the processing node to read-only. Additionally, data is retrieved from cache 206 (322).

In response to the request, updated data may be returned from another memory. If so, this updated data is returned to main memory (324). Otherwise, if data is not returned from another memory, any data retrieved from the current cache is returned to the main memory. Any updated data may also be replaced within the cache if the processing node is retaining this data for read-only purposes. If the processing node does not retain the data at all, an indication to this effect is provided to the main memory.

Returning to step 316, if the cache tags indicate the request may be fulfilled without making a request to one or more additional memories, the cache tags are updated (326). This may involve setting the cache line to an invalid state, or changing the privileges to read-only. Data is retrieved from the current cache and returned to main memory (328).

In another scenario, assume the reference indicator is not set to shared-cache mode in step 310. In this case, a request is issued to one or more other memories to retrieve the data (330). As described above, in one embodiment, this involves issuing a request to a processor bus 104, however, this need not be the case. Requests can be issued directly to one or more other memories coupled to the current cache, for example. While these requests are pending, cache tag information is updated within cache tag logic in the manner described above (332). If a cache miss does not occur, the requested data is retrieved from cache (334). If any updated data is received from another memory as a result of the requests, this updated data is returned to main memory. Otherwise, any data retrieved from cache is returned to the main memory. If the processing node does not retain the data, a response is provided indicating this situation (336).

Figure 4:
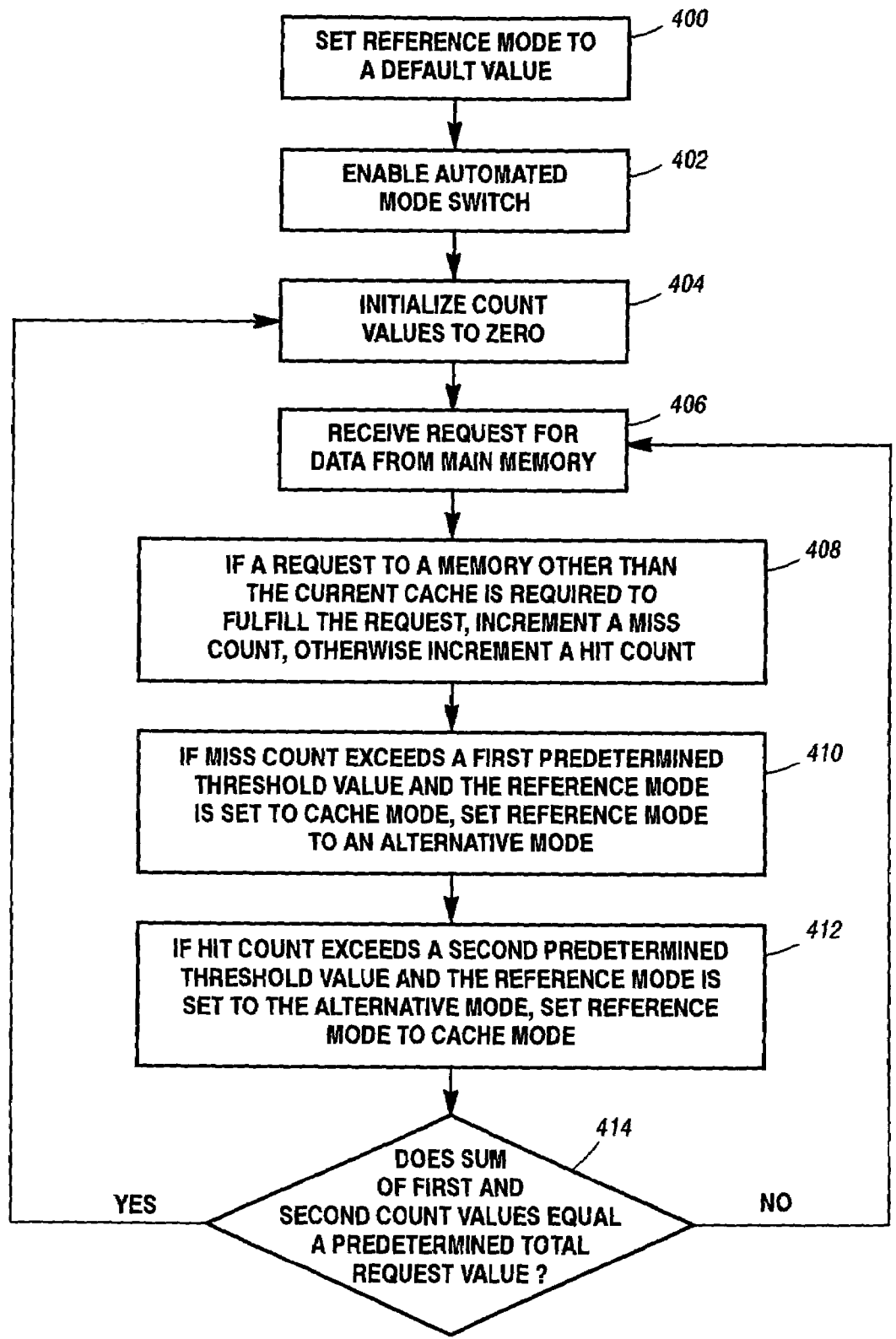
FIG. 4 is a flow diagram of one method of selecting the reference mode according to the current invention.

FIG. 4 is a flow diagram of one method of selecting, then updating, the reference mode according to the current invention. In step 400, the reference mode is programmed to a selected default value. This may be programmed using scan-engine 124 and scan-set interface 126. Next, an automated mode switch mechanism is enabled (402). In FIG. 2, this automated mechanism is shown as mode switch logic 290. Before this logic is enabled, the reference mode will remain set to whichever mode was programmed via scan-set interface 290 until the operating system or some other mechanism causes scan engine 124 to re-program this indicator.

After the automated mode switch mechanism is enabled, all count values used to control the mode switch mechanism are initialized to zero (404). Sometime thereafter, a request is received from a main memory, which in the system of FIG. 1 is SCD 100 (406). In the embodiment described above, this request may be presented first to a shared cache, which may be referred to as the "current cache memory", or alternatively, may be presented first to one or more other memories besides the current cache memory. This will be determined based on the current reference mode setting.

After the request is received, it may be processed in accordance with the reference mode setting. It may then be determined whether a reference to the one or more other memories was required to complete the request. In the embodiment described above, this may be ascertained by the type of request issued to, and the response received from, the processor bus, and/or the states of the tag indicators. If a request to the one or more other memories was required to fulfill the request, a miss count is incremented. Otherwise a hit count is incremented (408). Recall that a reference to one or more other memories may be required for reasons other than a cache miss. For example, these references may be required to invalidate the data copies retained by these other memories. Thus, the miss count does not correlate directly to the cache miss rate within shared cache.

Next, if the miss count exceeds a first predetermined threshold value and the reference mode is currently set to cache mode, this reference mode is modified to an alternative mode (410). In the embodiment described above, this alternative mode is referred to as the processor-bus mode, since it involves issuing requests directly to a processor bus. In another embodiment wherein one or more cache memories are directly or indirectly coupled to PND 102A via some mechanism other than a processor bus, this alternative mode may involve issuing requests in another way.

In step 412, if the hit count exceeds a second predetermined threshold value and the reference mode is currently set to the alternative mode, the reference mode is modified to the cache mode (412). Until the sum of the first and second count values reaches a predetermined value (414), the process continues with step 406 for each additional request received from the main memory. When the sum of the count values reaches a predetermined value, the count values are re-initialized in step 404, and the process is repeated.

The foregoing method is just one embodiment of a process for utilizing the mode switch logic 290 of FIG. 2. According to this method, mode switching is triggered when, within a predetermined number of requests, a threshold number of requests is processed in a non-optimal manner. For example, when in shared-cache mode, a predetermined number of requests must be processed by referencing processor bus. According to an alternative, the mode switching may be triggered when a threshold number of requests is processed in a non-optimal manner within a predetermined period of time. Other ways of measuring performance and selecting the mode switch setting are possible within the scope of the current invention.

Figure 5:
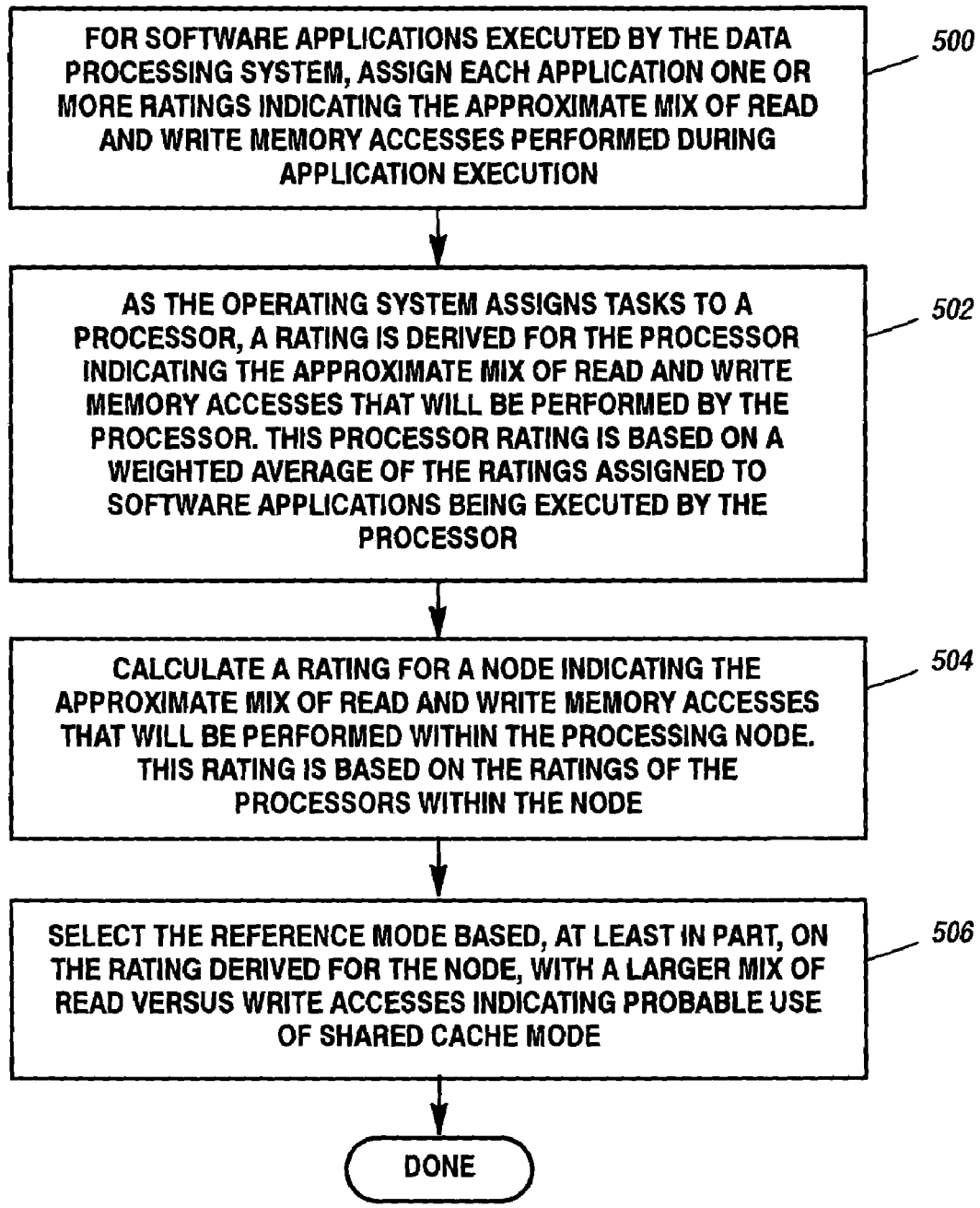
FIG. 5 is a flow diagram illustrating another method of selecting a reference mode setting according to the current invention.

FIG. 5 is a flow diagram illustrating another method of selecting a reference mode setting according to the current invention. In this embodiment, a rating is assigned to software applications that may be executed by the data processing system (500). This rating indicates an approximate mix of read and write accesses that will be performed during the execution of this application. In one embodiment, multiple ratings could be assigned to an application, with each rating being associated with a corresponding task to be accomplished by the software application.

Next, as the operating system assigns tasks to a given processor within the data processing system, the ratings for the one or more software applications associated with the assigned task are used to determine an overall processor rating (502). This rating is indicative of the overall mix of read and write accesses that will be performed by that processor while the assigned tasks are executing. In one embodiment, this processing rating may be derived from a weighted average that takes into consideration the percentage of overall processing time that will be spent executing each application, as may be determined by the processing priority assigned to the application.

Next, a rating may be determined for all processors within a node. This rating may average the processor ratings, for example (504). This rating provides an approximation of the read/write access mix that is occurring within the node at that time. This overall rating may be used either alone, or in conjunction with other system factors, to select the reference mode. If the mix indicates more reads than writes are likely occurring, it may be beneficial to select shared-cache mode, since this situation provides a greater likelihood that a request from SCD could be satisfied without accessing the processor bus. In contrast, if more writes than reads are occurring, processor-bus mode may be selected.

The process of FIG. 5 may be an on-going method that is used to continually tune the system. The reference mode may be updated as the various tasks being executed by the processors of a node change.

Although the exemplary embodiments described herein include a shared cache that is coupled to one or more dedicated caches via a processor bus, those skilled in the art will appreciate that the invention may be applied to many other embodiments. For example, the invention may be adapted for use within any hierarchical or other memory structure wherein two coupled storage devices may store data that is requested by a third entity. The memory structure may include all dedicated caches, all shared caches, or a combination thereof. Moreover, the memory structure need not be coupled via a bus, but may instead utilize another type of communication interface. Therefore, while various embodiments of the present invention have been described above, it should be understood that they have been presented by way of example only, and not as a limitation. Thus, the breadth and scope of the present invention should not be limited by any of the above-described exemplary embodiments, but should be defined only in accordance with the following Claims and their equivalents.

What is claimed is:

1. A memory system, comprising:
a first storage device;
at least one additional storage device;
a control storage device to store a programmable indicator identifying the manner in which the first and the at least one additional storage device are to be referenced; and
a control circuit coupled to the first storage device, the at least one additional storage device, and the control storage device, the control circuit to receive a request for data, wherein copies of the requested data may be stored within the first and the at least one additional storage device, and in response to the request, to attempt to retrieve the requested data by initiating, based on the state of the programmable indicator, at least one of a first reference to the first storage device and a second reference to the at least one additional storage device.

2. The system of claim 1, wherein the first and the second references are issued in a time order that is controlled by the state of the programmable indicator.

3. The system of claim 1, wherein if the programmable indicator is in a first state, the second reference is issued only if the first reference is not capable of completing the request.

4. The system of claim 3, wherein if the programmable indicator is in a second state, the second reference is issued regardless of whether the second reference is required to complete the request.

5. The system of claim 4, wherein if the programmable indicator is in the second state, the second reference is issued before the first reference.

6. The system of claim 1, and further including mode switch logic to modify the state of the programmable indicator between the first state and the second state based on programmable criteria.

7. The system of claim 6, wherein the control circuit receives multiple requests for data, and wherein the mode switch logic includes a circuit to modify the state of the programmable indicator from the first state to the second state if at least a first predetermined number of the multiple requests requires the second reference to complete.

8. The system of claim 7, wherein the mode switch logic includes a circuit to modify the state of the programmable indicator from the second state to the first state if a second predetermined number of the multiple requests does not require the second reference to complete.

9. The system of claim 8, wherein the mode switch logic includes a circuit that allows at least one of the first and the second predetermined numbers to be programmable selected.

10. The system of claim 8, and further including a main memory coupled to the first storage device to issue the request to the control circuit.

11. The system of claim 10, wherein the request is requesting data associated with one or more incomplete memory coherency actions, and further comprising a request tracking circuit coupled to the control circuit to track the incomplete memory coherency actions, whereby the data is returned to the main memory only after all of the coherency actions are completed.

12. A memory system, comprising:
first memory logic;
at least one other memory;
a storage device coupled to the first memory logic to store a programmable indicator identifying a mode of referencing the first memory logic and the at least one other memory; and a control circuit coupled to the first memory logic and the at least one other memory, the control circuit to receive a request for data, copies of which may be resident within the first memory logic and the at least one other memory, and in response thereto, to determine based on the identified mode whether to attempt to retrieve the requested data from the first memory logic, the at least one other memory, or both the first memory logic and the at least one other memory.

13. The system of claim 12, wherein the first memory logic includes at least one of a tag memory and a memory to store data.

14. The system of claim 12, wherein the control circuit includes a circuit to determine whether the programmable indicator is in a first predetermined state, and if so, to further determine whether the at least one other memory must be referenced to complete the request, and if not, to obtain the data from the first memory logic without reference to the at least one other memory.

15. The system of claim 14, wherein the control circuit includes a circuit to initiate references to both the first memory logic and the at least one other memory if the at least one other memory must be referenced to complete the request.

16. The system of claim 12, wherein the control circuit includes a circuit to determine whether the programmable indicator is in a second predetermined state, and if so, to initiate a reference to the first memory logic and the at least one other memory irrespective of whether a reference to the at least one other memory is necessary to complete the request.

17. The system of claim 12, wherein the control circuit includes a circuit to determine if the programmable indicator is in a third predetermined state indicating the first memory logic is unavailable for storing data, and if so, to initiate a reference to the at least one other memory without attempting to obtain the requested data from the first memory logic.

18. The system of claim 12, wherein the first memory logic includes a shared cache, wherein the at least one other memory includes one or more dedicated caches, and further comprising at least one instruction processor coupled to the one or more dedicated caches.

19. The system of claim 12, and further comprising a main memory coupled to the first memory logic to issue the request for the data.

20. The memory system of claim 12, and further including mode switch logic coupled to the storage device to automatically re-program the programmable indicator.

21. The memory system of claim 20, wherein the mode switch logic includes a circuit to monitor conditions within the memory system, and to automatically re-program the programmable indicator based on the monitored conditions.

22. A data processing system, comprising:
main memory means for storing data;
first cache means for storing a first sub-set of the data;
second cache means for storing a second subset of the data;
programmable storage means for storing one or more control signals to control the way in which data is retrieved from the first cache means and the second cache means; and
control means for receiving requests from the main memory means requesting return of data, the control means further for initiating a reference to retrieve the data from one or both of the first and second cache means based, at least in part, on the state of the one or more control signals.

23. The system of claim 22, and further including mode switch means for monitoring system conditions and automatically altering one or more of the control signals based on the system conditions.

24. The system of claim 22, wherein the first cache means includes tag means for storing tag information describing the first sub-set of the data; and wherein the control means includes means for initiating a reference to one or both of the first and the second cache means based, at least in part, on tag information for the requested data.

25. A method for use in a data processing system having a first memory coupled to at least one other memory and a programmable storage device, the programmable storage device to identify a reference mode to control the manner in which data is retrieved from at least one of the first memory and the at least one other memory, the method comprising:
a.) receiving a request for data, copies of which may be stored within at least one of the first memory and the at least one other memory; and
b.) based on the reference mode, initiating an operation to attempt to retrieve the requested data from the first memory, the at least one other memory, or from both the first memory and the at least one other memory.

26. The method of claim 25, wherein step b.) comprises:
if the reference mode selects a first mode, determining whether the request can be completed without accessing the at least one other memory; and
if the request can be completed without accessing the at least one other memory, obtaining the requested data from the first memory.

27. The method of claim 25, wherein step b.) comprises:
if the reference mode selects a first mode, determining whether the request can be completed without accessing the at least one other memory; and
if the request cannot be completed without accessing the at least one other memory, initiating references to the first memory and the at least one other memory to complete the request.

28. The method of claim 25, wherein if the reference mode selects a second mode, initiating a reference to the first memory and the at least one other memory irrespective of which of the first memory or the at least one other memory stores the data.

29. The method of claim 25, wherein step b.) comprises:
determining that the first memory is unavailable to store the requested data; and
obtaining the requested data from the at least one other memory.

30. The method of claim 25, and further including modifying the reference mode based on conditions within the data processing system.

31. The method of claim 25, wherein the data processing system includes a main memory coupled to the first memory, and wherein step a.) includes receiving a request for data from the main memory.

32. The method of claim 25, wherein the at least one other memory includes multiple coupled memories, and wherein step b.) comprises:
issuing a request for the requested data to the multiple coupled memories; and
receiving the requested data from one of the multiple coupled memories.

* * * * *